(12) United States Patent
Brand (10) Patent No.: US 11,548,189 B2
(45) Date of Patent: Jan. 10, 2023

(54) METHODS AND SYSTEMS FOR THE RECYCLING OF SHINGLES

(71) Applicant: Brand Technologies Corp., Denver, CO (US)

(72) Inventor: Howard C. Brand, Denver, CO (US)

(73) Assignee: Brand Technologies Corp., Denver, CO (US)

(\*) Notice: Subject to any disclaimer, the term of this patent is extended or adjusted under 35 U.S.C. 154(b) by 0 days.

(21) Appl. No.: 17/270,367

(22) PCT Filed: Aug. 20, 2019

(86) PCT No.: PCT/US2019/047312
§ 371 (c)(1),
(2) Date: Feb. 22, 2021

(87) PCT Pub. No.: WO2020/041347
PCT Pub. Date: Feb. 27, 2020

(65) Prior Publication Data
US 2021/0308910 A1 Oct. 7, 2021

Related U.S. Application Data

(60) Provisional application No. 62/719,814, filed on Aug. 20, 2018.

(51) Int. Cl.
*B29B 17/02* (2006.01)
*B29K 95/00* (2006.01)
*B29K 509/08* (2006.01)

(52) U.S. Cl.
CPC ...... *B29B 17/02* (2013.01); *B29B 2017/0224* (2013.01); *B29B 2017/0234* (2013.01);
(Continued)

(58) Field of Classification Search
CPC ............ B29B 17/02; B29B 2017/0224; B29B 2017/0234; B29B 2017/0293; B29K 2095/00
See application file for complete search history.

(56) References Cited

U.S. PATENT DOCUMENTS 5,221,338 A 6/1993 Gaudio et al.
5,223,032 A 6/1993 Gaudio et al.
(Continued)

FOREIGN PATENT DOCUMENTS

WO 2020041347 A1 2/2020

OTHER PUBLICATIONS

International Application No. PCT/US2019/047312 filed Aug. 20, 2019. First Named Inventor: Brand.
(Continued)

*Primary Examiner* — Joseph S Del Sole
*Assistant Examiner* — Baileigh Kate Darnell
(74) *Attorney, Agent, or Firm* — Santangelo Law Offices, P.C.

(57) ABSTRACT

Embodiments of the present invention may provide methods and systems for recycling asphalt shingles (1) perhaps in a chemical solution (2) to provide oil free recyclable fiberglass (6), oil free recyclable sand (7), and even recyclable oil (8). The present invention may provide a screened tubular rotating equipment (16) may be at least partially immersed (18) in a tank (17) of a chemical solution (2) to treat the asphalt shingles (1).

31 Claims, 7 Drawing Sheets

(52) U.S. Cl.
CPC ... *B29B 2017/0293* (2013.01); *B29K 2095/00* (2013.01); *B29K 2509/08* (2013.01)

(56) References Cited

U.S. PATENT DOCUMENTS

| | | | |
|---|---|---|---|
| 5,848,755 | A | 12/1998 | Zickell et al. |
| 6,626,193 | B1* | 9/2003 | Arrieta .................... B08B 3/041 134/122 R |
| 9,156,035 | B1 | 10/2015 | Horton et al. |
| 9,273,228 | B1 | 3/2016 | Hyer et al. |
| 9,440,239 | B1 | 9/2016 | Horton et al. |
| 10,189,994 | B2 | 1/2019 | Trumbore |
| 10,323,149 | B2 | 6/2019 | Russell |
| 2002/0066813 | A1 | 6/2002 | Mischo |
| 2003/0047193 | A1* | 3/2003 | Yount ..................... C03C 1/024 134/3 |
| 2004/0132842 | A1* | 7/2004 | Coffey ................ E01C 19/1072 521/40 |
| 2013/0036714 | A1* | 2/2013 | Bolton ................... C08L 95/00 53/473 |
| 2013/0104774 | A1 | 5/2013 | Teeter, Jr. et al. |
| 2013/0199410 | A1 | 8/2013 | Maldonado et al. |
| 2013/0220175 | A1 | 8/2013 | Zickell |
| 2014/0014000 | A1 | 1/2014 | Franzen et al. |
| 2014/0373749 | A1 | 12/2014 | Zickell et al. |
| 2016/0362339 | A1 | 12/2016 | Franzen et al. |
| 2017/0204267 | A1 | 7/2017 | Ferguson et al. |
| 2018/0141866 | A1 | 5/2018 | Kotefski et al. |
| 2019/0256783 | A1* | 8/2019 | Shelton, Jr. .......... B01D 21/283 |

OTHER PUBLICATIONS

International Application No. PCT/US2019/047312 filed Aug. 20, 2019 First Named Inventor: Brand. International Search Report dated Dec. 11, 2019. 4 pages.
International Application No. PCT/US2019/047312 filed Aug. 20, 2019 First Named Inventor: Brand. Written Opinion of the International Searching Authority dated Dec. 11, 2019. 4 pages.
U.S. Appl. No. 62/719,814, filed Aug. 20, 2018. First Named Inventor: Brand.
European Patent Application No. 19852177.5, first named inventor: Brand. Communication Pursuant to 34(3) EPC, dated Jan. 19, 2022. 4 pages.
European Patent Application No. 19852177.5, first named inventor: Brand. Communication regarding the European Search Report or Supplementary Search Report, dated Oct. 5, 2021. 4 pages.

* cited by examiner

METHODS AND SYSTEMS FOR THE RECYCLING OF SHINGLES

CROSS-REFERENCE TO RELATED APPLICATIONS

This is the United States National Phase of international patent application no. PCT/US2019/047312 filed Aug. 20, 2019, which claims claiming the benefit of and priority to U.S. Provisional Application No. 62/719,814 filed Aug. 20, 2018, each application and any priority cases are hereby incorporated by reference in their entirety herein.

TECHNICAL FIELD

The present invention relates to the recycling of asphalt shingles using mechanical systems and chemical formulas.

BACKGROUND OF THE INVENTION

Composite shingles that may be composed of a fiberglass form may be coated with asphalt and a coating of aggregate sand. In the past, shingles that have been scraped from a roof may have commonly been placed in a landfill or perhaps, they may have been ground into small pieces and possibly used as filler for asphalt road material. Asphalt shingles may take about 300 years to decompose in a landfill and, as a result, many states have declared asphalt shingles as unrecyclable. Shingles may have been grinded or even shredded to perhaps make them into small pieces that may have been mixed with rock and even asphalt to possibly become asphalt paving for road surfaces. The shingle and asphalt mixture may have resulted in road surfaces that may be prone to break-up under heavy loads, wide temperature variances, and the like.

Embodiments of the present invention address the need in developing a recycling process for shingles. A goal may be to develop a process that could reclaim oil from the asphalt and perhaps leave the fiberglass and even sand as clean and reusable. In embodiments of the present invention, a mechanical process may employ a novel and unique combination of mechanical machinery and chemical solutions. Previous attempts may have used solutions to form emulsions. The emulsions and other compounded solutions may have failed because they may have been unstable and may have only worked under very specific conditions, or perhaps for limited periods of time and therefore may not have been able to be used in a commercial recycling process.

DISCLOSURE OF THE INVENTION

The present invention includes a variety of aspects which may be selected in different combinations based upon the particular application or needs to be addressed. In one basic form, the present invention discloses methods and systems for efficient recycling of shingles.

One broad object of the present invention may be to provide the appropriate chemical formulas in effectively reacting and recycling components from asphalt shingles and the like.

Another object of the present invention may be to provide substantial recycling of almost all of the components of a reclaimed asphalt shingle.

Naturally further objects of the invention may exist and are disclosed throughout other areas of the specification, figures, and claims.

MODE(S) FOR CARRYING OUT THE INVENTION

As mentioned earlier, the present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

The non-limiting examples of processes described herein, perhaps when used sequentially, may perform three major recycling processes which may yield reusable materials that can be repurposed. In some embodiments, a processing system may use liquids to convert an asphalt coating of an asphalt shingle into oil and may leave a fiberglass form and sand clean. The solutions broadly described here can perform several functions in the recycling processes. An initial treatment of the asphalt shingles can remove the cellophane strips on the underside of the shingles.

Embodiments of the present invention may provide a method for recycling waste shingles comprising the steps of adding an asphalt shingle to a chemical solution; reacting said asphalt shingle in said chemical solution; separating said asphalt shingle into a separated fiberglass, separated asphalt shingle granules, and separated asphalt shingle oil; removing said separated asphalt shingle granules from said chemical solution; removing said separated fiberglass from said chemical solution; removing said separated asphalt shingle oil from said chemical solution; and perhaps even providing oil free recyclable fiberglass, oil free recyclable sand from said asphalt shingle granules, and recyclable oil. Other embodiments may provide a system for recycling waste shingles comprising a chemical solution capable of reacting with an asphalt shingle and separating said asphalt shingle into a separated fiberglass, separated asphalt shingle granules; and separated asphalt shingle oil; a cleaning system capable of cleaning said separated fiberglass, separated asphalt shingle granules; and separated asphalt shingle oil to provide oil free recyclable fiberglass, oil free recyclable sand from said asphalt shingle granules, and recyclable oil.

Figure 3:
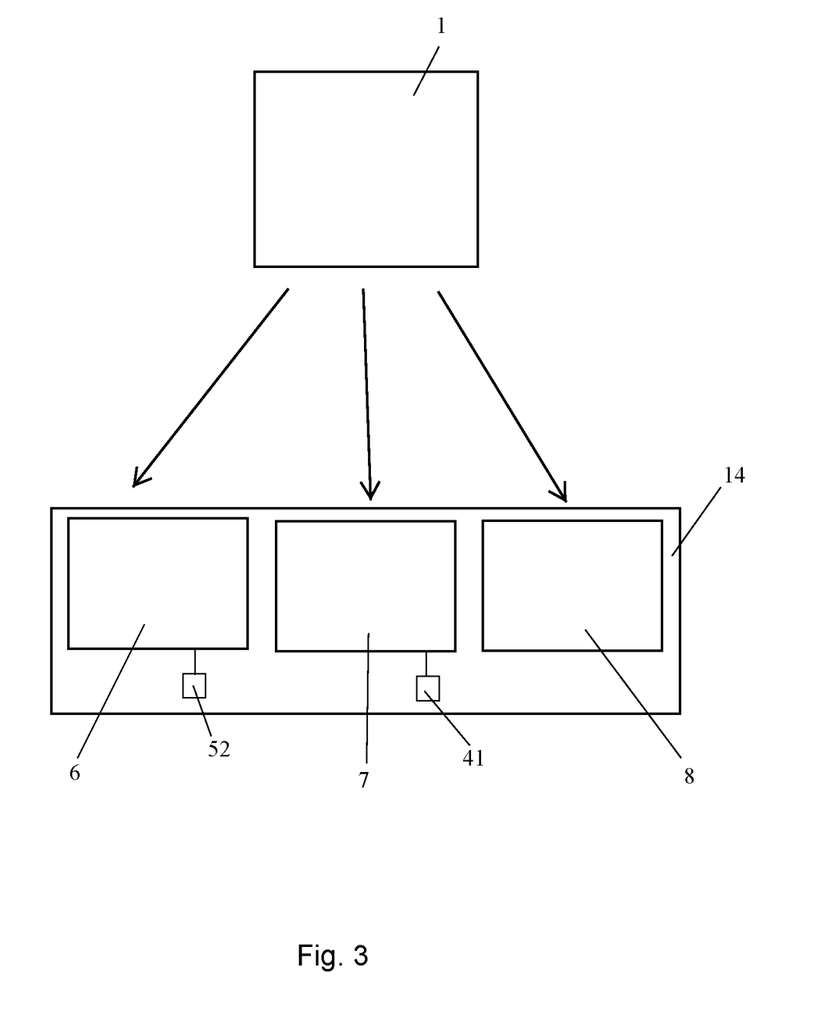
FIG. 3 is a non-limiting example of a representation of a system for separating components of asphalt shingles in accordance with various embodiments of the present invention.

Waste shingles may be recycled by adding an asphalt shingle (1) to a chemical solution (2). The asphalt shingle (1) may react with the chemical solution and may separate the asphalt shingle into a separated fiberglass (3), separated asphalt shingle granules (4) and perhaps even separated asphalt shingle oil (5). Separated fiberglass (3), separated asphalt shingle granules (4) and perhaps even separated asphalt shingle oil (5) may be removed from the chemical solution and may provide oil free recyclable fiberglass (6), oil free recyclable sand (7) from said asphalt shingle granules, and perhaps even recyclable oil (8) as may be understood in FIG. 3. A chemical solution may be capable of reacting with an asphalt shingle and separating the asphalt shingle into a separated fiberglass, separated asphalt shingle granules; and perhaps even separated asphalt shingle oil. A cleaning system (14) may be used to clean the separated fiberglass, separated asphalt shingle granules; and perhaps even separated asphalt shingle oil to provide oil free recyclable fiberglass, oil free recyclable sand from said asphalt shingle granules, and recyclable oil.

An asphalt shingle or a plurality thereof may be adding to a chemical solution perhaps by immersion, spraying, coating, sprinkling, diffusing, showering, or the like. A cleaning system (14) may include drying, separating, washing, washing with water, spraying, or the like of the separated components. A cleaning system may be a simple process to provide a recyclable component from a separated component.

An asphalt shingle (1) may be a reclaimed asphalt shingle, an intact asphalt shingle, a shingle which was not been ground up or shredded, or the like. In embodiments, the present invention may provide systems and methods which do not heat the asphalt shingles or even the chemical solutions. Separated asphalt shingle granules (48) may include sand (9), staples (10) and trash (11) which may have been part of the asphalt shingle. Staples and trash may be removed, extracted, or even separated from the sand perhaps to provide oil free recyclable sand perhaps with a separator (15) or the like. A separator (15) may be a staple extractor such as a magnet, may be done by hand sorting, or the like.

Figure 5:
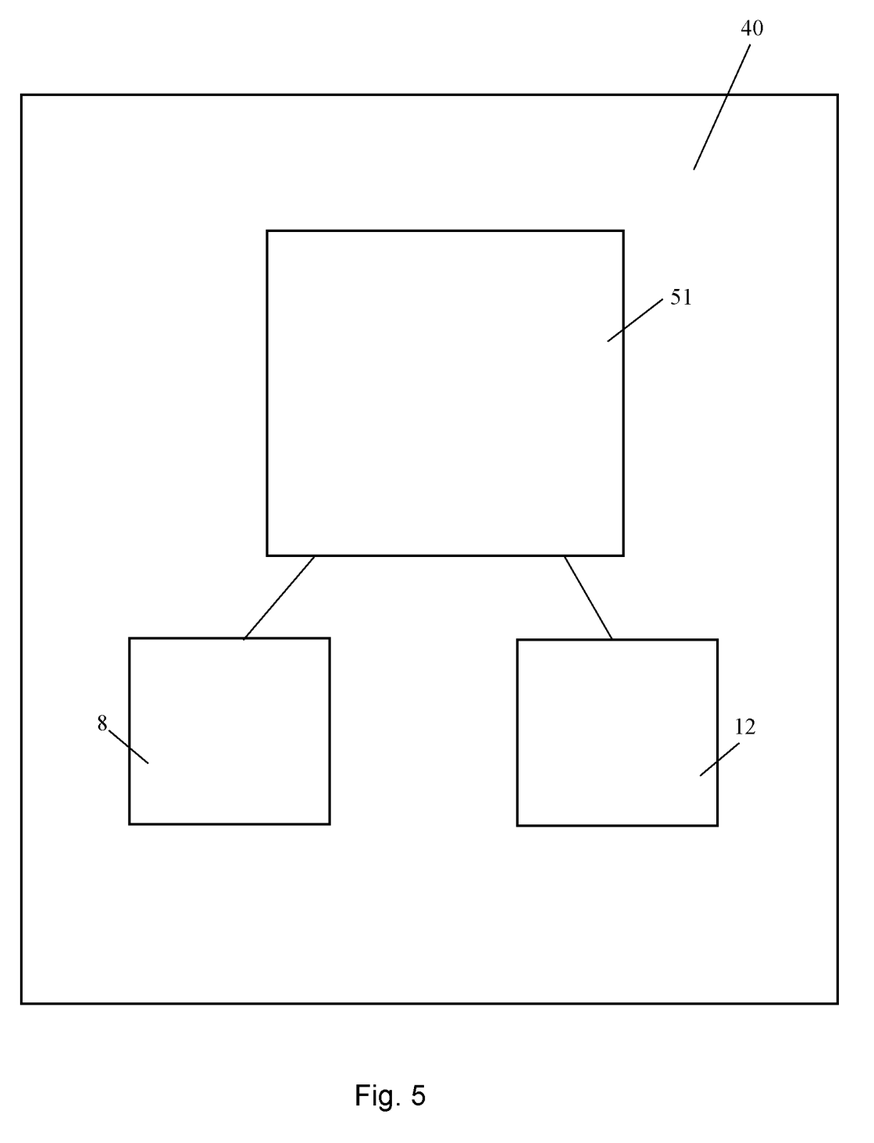
FIG. 5 is a non-limiting example of a representation of a system for separating oil and water in accordance with various embodiments of the present invention.

Separated fiberglass (3) may be washed after it may be removed from a chemical solution. In some embodiments, a separated fiberglass may include some separated asphalt shingle oil which can be washed off. Separated asphalt shingle granules may have some separated asphalt shingle oil thereon which can be washed off. A wash station (13) may be used to remove oil from separated fiberglass or even separated asphalt shingle granules. A wash station (13) may include water and a collector. Water may be used to wash the separated fiberglass or even separated asphalt shingle granules and a collector may collect the water and oil (51) being washed off. The water and oil (51) may then be separated in an oil water separator (40) to produce recyclable oil (8) and water (12) as may be understood in FIG. 5. After washing, oil free recyclable fiberglass (6) and even oil free recyclable sand (7) may be provided which can be dried perhaps with an oil free recyclable sand dryer (41) or even an oil free recyclable fiberglass dryer (52) or the like. The fiberglass and sand may be repurposed, resold, or the like.

Embodiments of the present invention may provide a system designed to keep a chemical solution in contact with asphalt shingles perhaps adding force so that liquefaction of the asphalt can occur quickly and completely. The present invention may provide, in embodiments, a screened tubular rotating equipment (16) which may be at least partially immersed (18) in a tank (17) of a chemical solution as may be understood in FIG. 1. A screened tubular rotating equipment may be a hollow cylinder which may allow liquids to pass through the screens. It may be rotating which may provide agitation to any components inside the equipment. A screened tubular rotating equipment (16) may be a screened tubular rotating sieve type trommel. A trommel may be a rotary, cylindrical or even conical screen. A screened tubular rotating equipment may be an angled screened tubular rotating equipment (19) perhaps where a shingle input (20) may be at a lower elevation (22) and a fiberglass output (21) may be at a higher elevation (23). Of course, in other embodiments, equipment may be non-tubular, rectangular, solid, non-screened, and perhaps even non-rotating or the like. Equipment may be partially or even fully immersed in a chemical solution. In other embodiments, equipment may not be immersed in a chemical solution. Equipment may have a motor (43), bearing race (44), bearings (45), and even a frame (46). Vapor in an equipment such as with a screened tubular rotating equipment may be recycled perhaps with a vapor recovery system (47) which may provide recycling of vapors and perhaps minimal to no loss of vapor.

Figure 1:
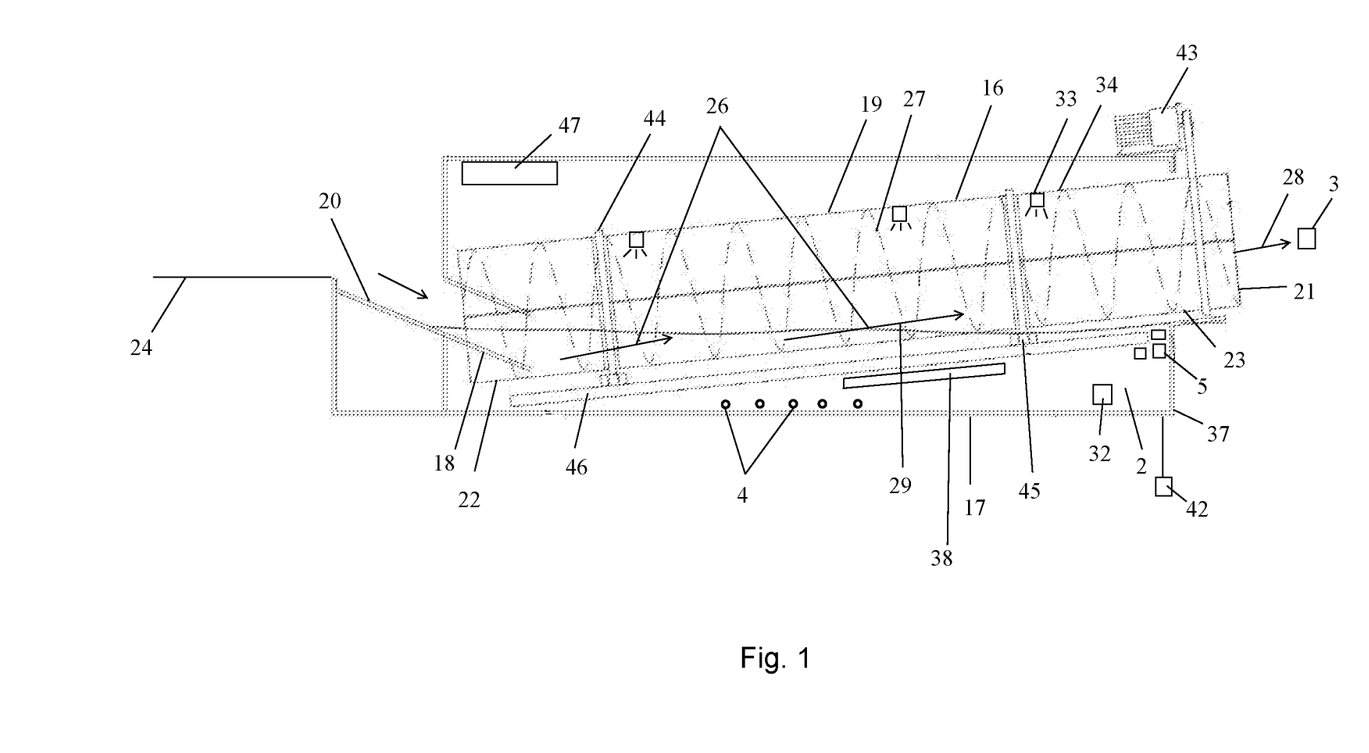
FIG. 1 is a non-limiting example of equipment which may be used to move and agitate shingles in accordance with various embodiments of the present invention.

An asphalt shingle may be inputted into a screened tubular rotating equipment or the like which may move and agitate the shingles. A shingle input (20) may include loading shingles onto a conveyor belt (24) and perhaps even into a hopper (25) or the like. A hopper may be a funnel shaped chamber or bin in which loose material may be inputted. A conveyor belt may be a belt, chain, rollers or the like which may carry materials over a distance. Shingles may be dropped into an input of a screened tubular rotating equipment. Rotating mechanical agitation (27) of the shingles such as by tumbling action may expose all the surfaces of the shingle to the chemical solution which may provide mixing of the asphalt shingle with the chemical solution. A screened tubular rotating equipment may be capable of mixing an asphalt shingle with a chemical solution. This mechanical action may reduce the time necessary to liquefy the asphalt, which may even simultaneously loosen granules that may then fall to the bottom of a tank. An upward angle of the trommel can convey a shingle perhaps via upwardly moving (29) through a melting process perhaps until the granules and even asphalt no longer coat a fiberglass form. The remaining fiberglass form, a separated fiberglass, may exit (28) the end of a screened tubular rotating equipment perhaps at a fiberglass output (21) may move on to a conveyor perhaps to a wash table. Separated fiberglass may have substantially no sand therein. A rotating equipment may rotate at various speeds, such as but not limited to, between about 0.5 to about 3 RPM or the like.

Figure 6:
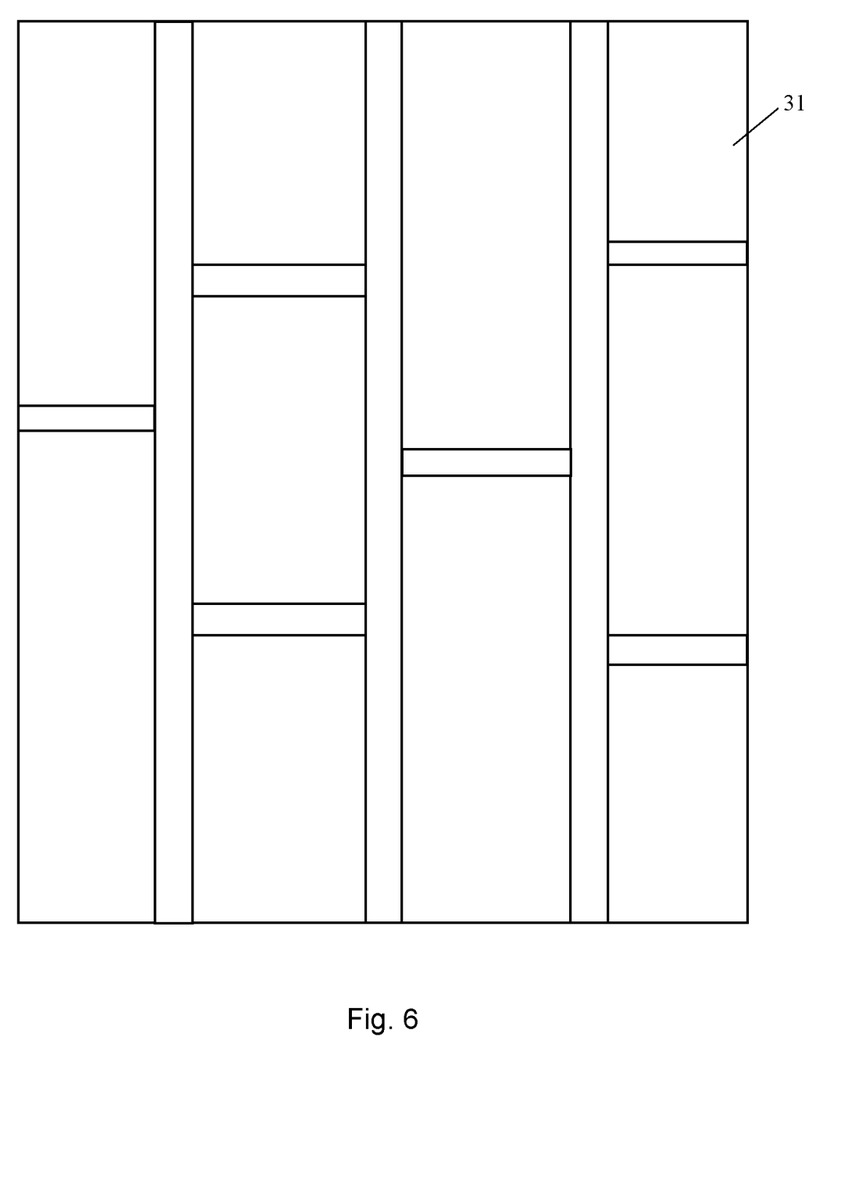
FIG. 6 is a non-limiting example of a representation of segmented compartments which may be inside a screened tubular rotation equipment in accordance with various embodiments of the present invention.
Figure 7:
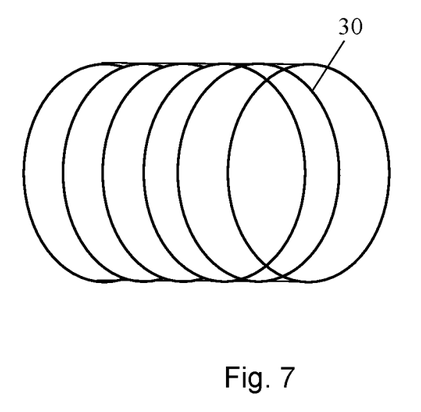
FIG. 7 is a non-limiting example of a representation of a rings which may be inside a screened tubular rotation equipment in accordance with various embodiments of the present invention.

An asphalt shingle may move through (26) a screened tubular rotating equipment perhaps to a fiberglass output (21). An inside of a screened tubular rotating equipment may include a plurality of rings (30) or perhaps even segmented compartments (31) or the like as may be understood in FIGS. 6 and 7. These rings or segmented compartments may help in the mixing of the shingles with the chemical solution and may even assist in moving the shingles through the screened tubular rotating equipment. Rings and segmented compartments may be thin metal projections on an inside of equipment. Liquid flow may assist in moving the shingles through the screened tubular rotating equipment.

In some embodiments, a screened tubular rotating equipment may be about 35 feet long, a asphalt shingle input may be about 5 feet wide, an exit opening for separated fiberglass may be about 6 feet wide, an incline from a bottom of one side of a screened tubular rotating equipment to the bottom on the opposite side of a screened tubular rotating equipment may be about 4 feet. Of course, any size may be used and all are meant to be included in this disclosure.

Tanks (17) containing chemical solutions may be equipped with recirculating pumps (32) and perhaps even rotating mechanical agitation that may expose the surface of the shingles to solutions chemicals repeatedly, and of adequate duration, perhaps to liquefy the asphalt. The turbulence and recirculation of chemical solutions perhaps in combination with the asphalt yielded oil, may continue to liquefy additional shingles.

Figure 4:
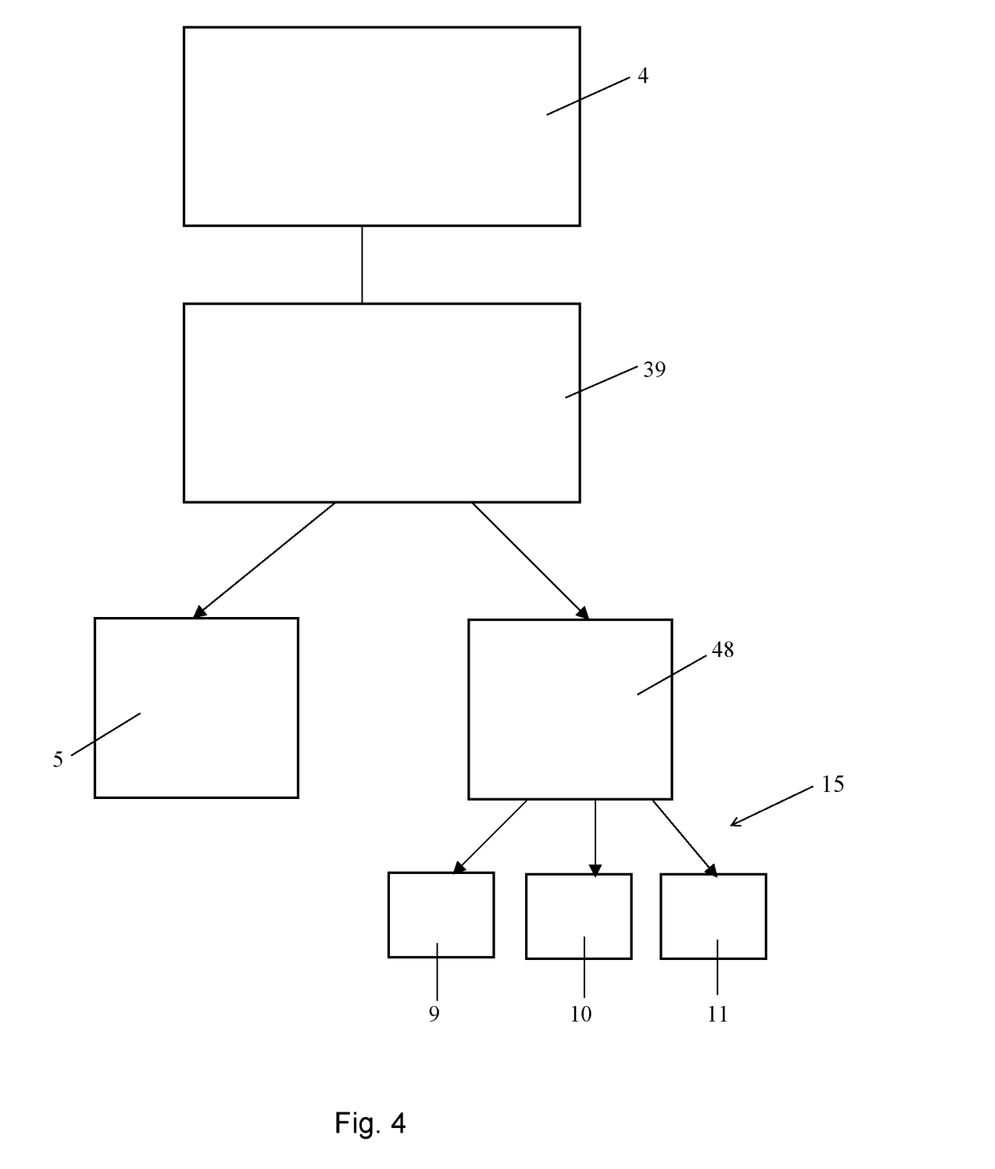
FIG. 4 is a non-limiting example of a representation of a system for washing separated asphalt shingle granules in accordance with various embodiments of the present invention.

Granules that may coat the asphalt shingle may fall off of the liquefied asphalt, may fall through a screened tubular rotating equipment perhaps to a bottom (37) of a tank. A separated asphalt shingle granules collector (38) may be located at a bottom of a tank. Separated asphalt shingle granules may be removed from a tank perhaps with an asphalt shingle granules collector (38) which may be a grain auger or the like. Separated asphalt shingle granules may be washed perhaps with a wash system (39) perhaps to remove separated asphalt shingle oil (5) from the separated asphalt shingle granules to provide oil free recyclable granules (48) as may be understood in FIG. 4. A wash system (39) may include a trommel and water such as a washing trommel or the like. Any oils may be washed from the sand perhaps in a washing trommel or perhaps even a sand screw and water. The total process may create an oil yield that may be several times greater than the amount of the solution placed in contact with the shingles.

In embodiments of the present invention, an asphalt shingles recycling process may use chemical solutions, possibly combined with multiple applications of agitation from mechanical tumbling, recirculating pumps, and perhaps even spray systems which may liquefy the asphalt perhaps to become marketable liquid oil. Asphalt shingles may be sprayed perhaps with a high pressure sprayer (33) which may spray a chemical solution onto the asphalt shingles. A sprayer may be located above (34) or even under shingles. Embodiments may provide mechanically moving asphalt shingles through a process that may apply specific solutions, possibly in a specific sequence, perhaps to liquefy asphalt on composite asphalt shingles.

An initial entry point of the shingles may be through a conveyer system which may guide the shingles to be put into a hopper which may feed into a rotating trommel. The trommel may immerse and rotate the shingles, possibly in a proprietary chemical which may loosen and liquify the asphalt. Pumps may circulate the mixture of liquefied oil and chemicals which may form a bonded solution that may continue to liquefy shingles as they are fed through the trommel. A spray system, possibly inside the trommel, may continuously spray the shingles from above and perhaps even below as they move through the trommel. As the asphalt liquifies, the sand coating may drop-off and may fall through screens of the trommel perhaps to the bottom of the tank.

Figure 2:
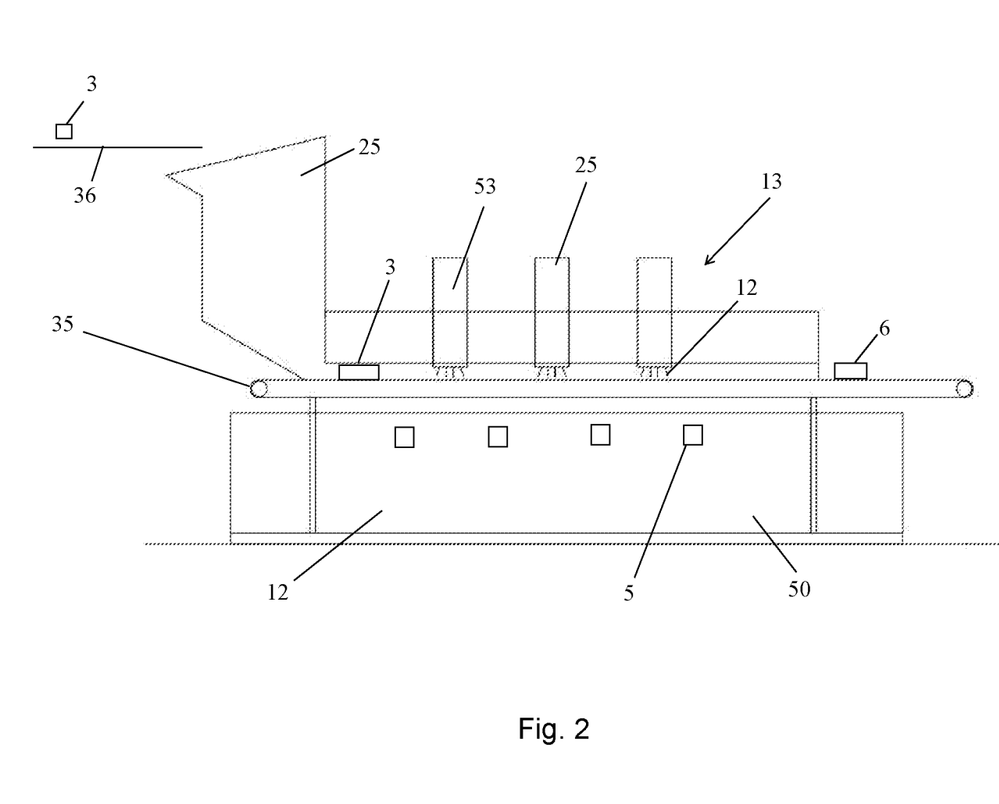
FIG. 2 is a non-limiting example of equipment that may catch fiberglass perhaps after exiting a screened tubular rotating equipment in accordance with various embodiments of the present invention.

FIG. 2 shows a non-limiting example of a spray system (35). Separated fiberglass may exit through a fiberglass output of a screened tubular rotating equipment perhaps into a conveyer belt (36) and into a hopper (25). A conveyer belt may transport separate fiberglass from a fiberglass output to a spray system (53). A sprayer system may be located above the separate fiberglass and may direct high pressure water on to the fiberglass form perhaps to remove any remaining oil from the fiberglass form. Here separated fiberglass (3) may be washed to separate separated shingle oil from the fiberglass. A conveyor may drop the cleaned fiberglass into a drying bin ready for repurposing.

The water and oil from the spray system may accumulate in the tank (50) below the conveyor or perhaps the water and oil (51) from the wash system or any other accumulation of water and oil (51) from cleaning systems may be collected, then separated perhaps by filtering into oil (8) and water (12), and perhaps even may be recycled. Embodiments of the present invention may provide an oil water separator (40) as may be shown in FIG. 5. The oil may then be collected and even recycled perhaps by being pumped into a storage tank perhaps for sale, and the water may be reconditioned and even returned to the spray system, possibly for continued use in washing the fiberglass or other cleaning system. The washed fiberglass may be conveyed to a bin where it may be dried and may even be prepared for repurposing.

The sand that may be freed from the asphalt shingle, as the asphalt may be liquefied, may be augured out of the bottom of the trommel tank and conveyed to a sand washing smaller Trommel. Once completely clean of oil, the sand may be stock-piled for repurposing. In embodiments of the present invention, a smaller trommel may be used to wash the sand that may be augured from the bottom of a large trommel tank. A smaller trommel may wash any remaining hydrocarbons from the sand and the sand may be stored for repurposing. The sand coating that may cover the asphalt shingles may drop from the liquefied asphalt and may fall perhaps through trommel screens to the bottom of a tank. The sand may then be augured out of the tank perhaps to a conveyor that may deposit the sand in perhaps a smaller, separate trommel, where it may be washed using, for example, a combination of a specific chemical and an electrified water, to remove any remaining asphalt oil. The sand may then be dried for repurposing.

A chemical solution used to convert the asphalt to liquid oil may bond with the oil and the mixture may be used to liquefy multiple loads of shingles, possibly until the solution may be saturated with oil. The oil can be collected in a tank and perhaps pumped with a pump (42) from the tank to the oil "sell tank" where it can be stored until sold therefore recycling the recyclable oil. Recyclable oil may be crude oil, light sweet crude oil, or the like.

Embodiments of the present invention may provide a system which may utilize a cavitation pump that could allow the systems to use large amounts of water perhaps as a hydrogen source. This may have allowed the system to use small amounts of a solution with water. The hydrogen from the water may bond with the oil during cavitation. This process may create a very high oil yield.

Equipment may be connected sequentially and may add the physical forces and even chemical solutions at the right time and perhaps even in the correct order, with the correct amount of force, to the surfaces of the asphalt shingles which may result in the conversion of the asphalt into sellable oil, fiberglass, and sand, as just a few non-limiting examples.

In embodiments of the present invention, a chemical solution may include at least one petroleum chemical. A chemical solution may be a recipe of alicyclic solvents and even aliphatic solvents. Alicyclic solvents may include but are not limited to cyclopropane, cyclobutene, cyclopentane, cyclohexane, cycloheptane, cyclooctane, bicycloundecane, decalin, housane, cubane, basketane, tetrahedrane, any combination thereof or the like. Aliphatic solvents may include but are not limited to mineral spirits, petroleum naphtha, petroleum distillate, cyclohexane, octane, pentane, isopentane nonane, any combination thereof, or the like. A chemical solution may be made of several chemicals which may actively liquefy the asphalt coating on a composite asphalt shingle. The solution components may also bond with the oil made during the liquefaction, perhaps without contaminating the oil to be sold. A specific combination of chemical components may be specifically blended according to the composition of the asphalt and the binders that may be contained in the asphalt of the shingle, and the silica dust and sand that may be used to coat the asphalt shingle.

In embodiments, chemical solutions may be compatible with the oil and may not contaminate the oil to be sold. The oil that may be rendered from the chemical liquefaction of asphalt shingles may have an API number of light "sweet" crude. The chemical solutions used to liquefy the asphalt into oil may also render the fiberglass form clean of oil. The chemical solutions perhaps used to liquefy the asphalt into oil, may also render the aggregate sand that coats the shingle, clean of oil. In other embodiments, chemical solutions may be designed to be mixed with dilutive agents that may maintain the API of the oil. The chemical solutions may be designed to be blended with or even without water to possibly increase the oil yield produced.

In some embodiments, a chemical solution, perhaps when liquefying the asphalt, may thicken as multiple liquefactions occur and a dilutive agent may be added from time to time, that may be compatible with the chemical and oil composition. This may allow the liquefaction to continue perhaps without contaminating the oil with undesired chemical compounds. Various dilutions by various chemicals may be used, perhaps depending on the specific gravity of the liquid produced. The selection of the additives may determine how long the asphalt liquefaction can occur without increased thickening.

Exemplary clauses may include:

Clause 1. A method for recycling waste shingles comprising the steps of:
  adding an asphalt shingle to a chemical solution;
  reacting said asphalt shingle in said chemical solution;
  separating said asphalt shingle into a separated fiberglass, separated asphalt shingle granules, and separated asphalt shingle oil;
  removing said separated asphalt shingle granules from said chemical solution;
  removing said separated fiberglass from said chemical solution;
  removing said separated asphalt shingle oil from said chemical solution; and
  providing oil free recyclable fiberglass, oil free recyclable sand from said asphalt shingle granules, and recyclable oil.

Clause 2. The method for recycling waste shingles as described in clause 1 or any other clause wherein said asphalt shingle comprises a reclaimed asphalt shingle.

Clause 3. The method for recycling waste shingles as described in clause 1 or any other clause wherein said asphalt shingle comprises an intact asphalt shingle.

Clause 4. The method for recycling waste shingles as described in clause 1 or any other clause wherein said method does not heat said asphalt shingle or said chemical solution.

Clause 5. The method for recycling waste shingles as described in clause 1 or any other clause wherein said separated asphalt shingle granules comprises sand, staples and trash.

Clause 6. The method for recycling waste shingles as described in clause 5 or any other clause and further comprising removing said staples and trash from said sand to provide said oil free recyclable sand.

Clause 7. The method for recycling waste shingles as described in clause 1 or any other clause and further comprising the step of washing said separated fiberglass to provide said oil free recyclable fiberglass.

Clause 8. The method for recycling waste shingles as described in clause 7 or any other clause wherein said step of washing said separated fiberglass comprises the step of washing said fiberglass with water.

Clause 9. The method for recycling waste shingles as described in clause 7 or any other clause and further comprising the step of drying said oil free recyclable fiberglass.

Clause 10. The method for recycling waste shingles as described in clause 1 or any other clause and further comprising the step of inputting said asphalt shingle into a screened tubular rotating equipment which is at least partially immersed in a tank of said chemical solution.

Clause 11. The method for recycling waste shingles as described in clause 10 or any other clause wherein said screened tubular rotating equipment comprises a screened tubular rotating sieve type trommel.

Clause 12. The method for recycling waste shingles as described in clause 10 or any other clause wherein said screened tubular rotating equipment comprises an angled screened tubular rotating equipment.

Clause 13. The method for recycling waste shingles as described in clause 12 or any other clause wherein said angled screened tubular rotating equipment is at a lower elevation for a shingle input and at a higher elevation for a fiberglass output.

Clause 14. The method for recycling waste shingles as described in clause 10 or any other clause wherein said step of inputting said asphalt shingle into a screened tubular rotating equipment comprises the step of inputting said asphalt shingle through a conveyor belt and hopper into said screened tubular rotating equipment.

Clause 15. The method for recycling waste shingles as described in clause 10 or any other clause and further comprising the step of moving said asphalt shingle through said screened tubular rotating equipment to a fiberglass output.

Clause 16. The method for recycling waste shingles as described in clause 10 or any other clause and further comprising the step of providing rotating mechanical agitation to said asphalt shingle.

Clause 17. The method for recycling waste shingles as described in clause 10 or any other clause and further comprising mixing said asphalt shingle with said chemical solution in said tank.

Clause 18. The method for recycling waste shingles as described in clause 15 or any other clause wherein said separated fiberglass exits said fiberglass output and wherein said separated fiberglass comprises substantially no sand.

Clause 19. The method for recycling waste shingles as described in clause 15 or any other clause wherein said step of moving said asphalt shingle through said screened tubular rotating equipment to a fiberglass output comprises the step of upwardly moving said asphalt shingle through said screened tubular rotating equipment to a fiberglass output.

Clause 20. The method for recycling waste shingles as described in clause 19 or any other clause wherein said step of upwardly moving said asphalt shingle through said screened tubular rotating equipment to a fiberglass output is assisted by a plurality of rings in said screened tubular rotating equipment.

Clause 21. The method for recycling waste shingles as described in clause 10 or any other clause and further comprising the step of providing recirculating pump in said tank of said chemical solution.

Clause 22. The method for recycling waste shingles as described in clause 10 or any other clause and further comprising the step of high pressure spraying said asphalt shingles with said chemical solution in said screened tubular rotating equipment.

Clause 23. The method for recycling waste shingles as described in clause 22 or any other clause wherein said step of high pressure spraying said asphalt shingles with said chemical solution in said screened tubular rotating equipment comprises the step of high pressure spraying said asphalt shingles with said chemical solution from above in said screened tubular rotating equipment.

Clause 24. The method for recycling waste shingles as described in clause 15 or any other clause and further comprising providing a spray system for said separated fiberglass exiting said fiberglass output of said screened tubular rotating equipment.

Clause 25. The method for recycling waste shingles as described in clause 24 or any other clause and further comprising the step of washing separated shingle oil from said fiberglass with said spray system.

Clause 26. The method for recycling waste shingles as described in clause 24 or any other clause and further comprising providing a conveyor belt to transport said separated fiberglass from said fiberglass output to said spray system.

Clause 27. The method for recycling waste shingles as described in clause 15 or any other clause and further comprising allowing said separated asphalt shingle granules to fall to a bottom of said tank through said screened tubular rotating equipment.

Clause 28. The method for recycling waste shingles as described in clause 27 or any other clause and further comprising the step of removing said separated asphalt shingle granules from said tank.

Clause 29. The method for recycling waste shingles as described in clause 28 or any other clause wherein said step of removing said separated asphalt shingle granules from said tank comprises the step of removing said separated asphalt shingle granules from said tank with a grain auger.

Clause 30. The method for recycling waste shingles as described in clause 28 or any other clause and further comprising the step of washing said separated asphalt shingle granules to remove said separated asphalt shingle oil from said separated asphalt shingle granules to provide said oil free recyclable sand.

Clause 31. The method for recycling waste shingles as described in clause 30 or any other clause and further comprising the steps of:
collecting water and said separated asphalt shingle oil from said washing step;
separating said separated asphalt shingle oil from said water; and recycling said separated asphalt shingle oil.

Clause 32. The method for recycling waste shingles as described in clause 30 or any other clause wherein said step of washing said separated asphalt shingle granules to remove oil from said separated asphalt shingle granules comprises the step of washing said separated asphalt shingle granules to remove oil from said separated asphalt shingle granules in a trommel.

Clause 33. The method for recycling waste shingles as described in clause 30 or any other clause wherein said step of washing said separated asphalt shingle granules to remove oil from said separated asphalt shingle granules comprises the step of washing said separated asphalt shingle granules to remove separated asphalt shingle oil from said separated asphalt shingle granules with a sand screw.

Clause 34. The method for recycling waste shingles as described in clause 28 or any other clause and further comprising the step of extracting staples from said separated asphalt shingle granules with a magnet.

Clause 35. The method for recycling waste shingles as described in clause 30 or any other clause and further comprising the step of drying said oil free recyclable sand.

Clause 36. The method for recycling waste shingles as described in clause 32 or any other clause and further comprising the step of collecting and recycling said separated asphalt shingle oil.

Clause 37. The method for recycling waste shingles as described in clause claim 10 or any other clause wherein said step of reacting said asphalt shingle in said chemical solution comprising the step of liquifying said asphalt shingle in said screened tubular rotating equipment so that said separated asphalt shingle oil is collected in said tank.

Clause 38. The method for recycling waste shingles as described in clause 37 or any other clause and further comprising the step of pumping said separated asphalt shingle oil out of said tank and recycling said separated asphalt shingle oil.

Clause 39. The method for recycling waste shingles as described in clause 1 or any other clause wherein said recyclable oil comprises crude oil.

Clause 40. The method for recycling waste shingles as described in clause 1 or any other clause wherein said recyclable oil comprises light sweet crude oil.

Clause 41. The method for recycling waste shingles as described in clause 1 or any other clause wherein said chemical solution comprise at least one petroleum chemical.

Clause 42. The method for recycling waste shingles as described in clause 1 or any other clause wherein said chemical solution comprise alicyclic solvents and aliphatic solvents.

Clause 43. A system for recycling waste shingles comprising:
- a chemical solution capable of reacting with an asphalt shingle and separating said asphalt shingle into a separated fiberglass, separated asphalt shingle granules; and separated asphalt shingle oil;
- a cleaning system capable of cleaning said separated fiberglass, separated asphalt shingle granules; and separated asphalt shingle oil to provide oil free recyclable fiberglass, oil free recyclable sand from said asphalt shingle granules, and recyclable oil.

Clause 44. The system for recycling waste shingles as described in clause 43 or any other clause wherein said asphalt shingle comprises a reclaimed asphalt shingle.

Clause 45. The system for recycling waste shingles as described in clause 43 or any other clause wherein said asphalt shingle comprises an intact asphalt shingle.

Clause 46. The system for recycling waste shingles as described in clause 43 or any other clause wherein said system does not heat said asphalt shingle or said chemical solution.

Clause 47. The system for recycling waste shingles as described in clause 43 or any other clause wherein said separated asphalt shingle granules comprises sand, staples and trash.

Clause 48. The system for recycling waste shingles as described in clause 47 or any other clause and further comprising a separator capable of removing said staples and trash from said sand to provide said oil free recyclable sand.

Clause 49. The system for recycling waste shingles as described in clause 43 or any other clause and further comprising a wash station for said separated fiberglass to provide said oil free recyclable fiberglass.

Clause 50. The system for recycling waste shingles as described in clause 49 or any other clause wherein said wash station utilizes water.

Clause 51. The system for recycling waste shingles as described in clause 43 or any other clause and further comprising a screened tubular rotating equipment which is at least partially immersed in a tank of said chemical solution.

Clause 52. The system for recycling waste shingles as described in clause 51 or any other clause wherein said screened tubular rotating equipment comprises a screened tubular rotating sieve type trommel.

Clause 53. The system for recycling waste shingles as described in clause 51 or any other clause wherein said screened tubular rotating equipment comprises an angled screened tubular rotating equipment.

Clause 54. The system for recycling waste shingles as described in clause 53 or any other clause wherein said angled screened tubular rotating equipment is at a lower elevation for a shingle input and at a higher elevation for a fiberglass output.

Clause 55. The system for recycling waste shingles as described in clause 51 or any other clause and further comprising a conveyor belt and hopper into said screened tubular rotating equipment.

Clause 56. The system for recycling waste shingles as described in clause 51 or any other clause wherein said screened tubular rotating equipment comprises an asphalt shingle input and a fiberglass output.

Clause 57. The system for recycling waste shingles as described in clause 51 or any other clause wherein said screened tubular rotating equipment is capable of providing rotating mechanical agitation to said asphalt shingle.

Clause 58. The system for recycling waste shingles as described in clause 51 or any other clause wherein said screened tubular rotating equipment which is at least partially immersed in a tank of said chemical solution is capable of mixing said asphalt shingle with said chemical solution in said tank.

Clause 59. The system for recycling waste shingles as described in clause 56 or any other clause wherein fiberglass output is capable of exiting said separated fiberglass and wherein said separated fiberglass comprises substantially no sand.

Clause 60. The system for recycling waste shingles as described in clause 51 or any other clause wherein said screened tubular rotating equipment comprises segmented compartments inside said screened tubular rotating equipment.

Clause 61. The system for recycling waste shingles as described in clause 51 or any other clause wherein said screened tubular rotating equipment comprises a plurality of rings in said screened tubular rotating equipment.

Clause 62. The system for recycling waste shingles as described in clause 51 or any other clause and further comprising a recirculating pump in said tank of said chemical solution.

Clause 63. The system for recycling waste shingles as described in clause 51 or any other clause and further comprising a high pressure sprayer capable of cleaning said asphalt shingles with said chemical solution in said screened tubular rotating equipment.

Clause 64. The system for recycling waste shingles as described in clause 63 or any other clause wherein said high pressure sprayer is located above said asphalt shingles in said screened tubular rotating equipment.

Clause 65. The system for recycling waste shingles as described in clause 56 or any other clause and further comprising a spray system for said separated fiberglass.

Clause 66. The system for recycling waste shingles as described in clause 65 or any other clause and further comprising a conveyor belt capable of transporting said separated fiberglass from said fiberglass output to said spray system.

Clause 67. The system for recycling waste shingles as described in clause 56 or any other clause and further comprising a separated asphalt shingle granules collector at a bottom of said tank.

Clause 68. The system for recycling waste shingles as described in clause 67 or any other clause wherein said separated asphalt shingle granules collector comprises a grain auger.

Clause 69. The system for recycling waste shingles as described in clause 43 or any other clause and further comprising a wash system capable of washing said separated asphalt shingle granules to remove said separated asphalt shingle oil from said separated asphalt shingle granules to provide said oil free recyclable sand.

Clause 70. The system for recycling waste shingles as described in clause 69 or any other clause and further comprising an oil water separator capable of separating oil from water from said wash system.

Clause 71. The system for recycling waste shingles as described in clause 69 or any other clause wherein said wash system comprises a trommel and water.

Clause 72. The system for recycling waste shingles as described in clause 69 or any other clause wherein said wash system comprises a sand screw and water.

Clause 73. The system for recycling waste shingles as described in clause 43 or any other clause and further comprising a staple extractor capable of extracting staples from said separated asphalt shingle granules Clause 74. The system for recycling waste shingles as described in clause 73 or any other clause wherein said staple extractor comprises a magnet.

Clause 75. The system for recycling waste shingles as described in clause 69 or any other clause and further comprising an oil free recyclable sand dryer.

Clause 76. The system for recycling waste shingles as described in clause 58 or any other clause and further comprising a pump capable of pumping said separated asphalt shingle oil out of said tank.

Clause 77. The system for recycling waste shingles as described in clause 43 or any other clause wherein said recyclable oil comprises crude oil.

Clause 78. The system for recycling waste shingles as described in clause 43 or any other clause wherein said recyclable oil comprises light sweet crude oil.

Clause 79. The system for recycling waste shingles as described in clause 43 or any other clause wherein said chemical solution comprise at least one petroleum chemical.

Clause 80. The system for recycling waste shingles as described in clause 43 or any other clause wherein said chemical solution comprise alicyclic solvents and aliphatic solvents.

As can be easily understood from the foregoing, the basic concepts of the present invention may be embodied in a variety of ways. It involves both recycling techniques as well as devices to accomplish the appropriate recycling of asphalt shingles. In this application, the recycling techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "liquifier" should be understood to encompass disclosure of the act of "liquifying"—whether explicitly discussed or not—and, conversely, were there effectively disclosure of the act of "liquifying", such a disclosure should be understood to encompass disclosure of a "liquifier" and even a "means for liquifying." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the below list of reference or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

| U.S. PATENTS | | | |
|---|---|---|---|
| Pat. No. | Kind Code | Issue Date | Name of Patentee or Applicant of cited Document |
| 9,273,228 | B1 | 2016 Mar. 1 | Hyer et al. |
| 9,440,239 | B1 | 2016 Sep. 13 | Horton et al. |
| 9,156,035 | B1 | 2015 Oct. 13 | Horton et al. |
| 10/189,994 | B2 | 2019 Jan. 29 | Trumbore |
| 10/323,149 | B2 | 2019 Jun. 18 | Russell |

| U.S. PATENT APPLICATION PUBLICATIONS | | | |
|---|---|---|---|
| Publication No. | Kind Code | Publication Date | Name of Patentee or Applicant of cited Document |
| 20130199410 | A1 | 2013 Aug. 8 | Maldonado et al. |
| 20140014000 | A1 | 2014 Jan. 16 | Franzen et al. |
| 20130220175 | A1 | 2013 Aug. 29 | Zickell |
| 20160362339 | A1 | 2016 Dec. 15 | Franzen et al. |

Thus, the applicant(s) should be understood to have support to claim and make a statement of invention to at least: i) each of the recycling devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for recycling waste shingles comprising the steps of:
adding an asphalt shingle to a chemical solution;
reacting said asphalt shingle in said chemical solution;
one step simultaneously separating said reacted asphalt shingle into three components at the same time, said three components comprising separated fiberglass, separated asphalt shingle granules, and separated asphalt shingle oil;
collecting said separated asphalt shingle granules after said step of one step simultaneously separating said reacted asphalt shingle into said three components;
collecting said separated fiberglass after said step of one step simultaneously separating said reacted asphalt shingle into said three components;
collecting said separated asphalt shingle oil after said step of one step simultaneously separating said reacted asphalt shingle into said three components; and
providing oil free recyclable fiberglass, oil free recyclable sand from said asphalt shingle granules, and recyclable oil.

2. The method for recycling waste shingles as described in claim 1 wherein said method does not heat said asphalt shingle or said chemical solution.

3. The method for recycling waste shingles as described in claim 1 wherein said separated asphalt shingle granules comprises sand, staples and trash.

4. The method for recycling waste shingles as described in claim 3 and further comprising removing said staples and trash from said sand to provide said oil free recyclable sand.

5. The method for recycling waste shingles as described in claim 1 and further comprising the step of washing said separated fiberglass to provide said oil free recyclable fiberglass.

6. The method for recycling waste shingles as described in claim 5 wherein said step of washing said separated fiberglass comprises the step of washing said fiberglass with water.

7. The method for recycling waste shingles as described in claim 1 and further comprising the step of inputting said asphalt shingle into a screened tubular rotating equipment which is at least partially immersed in a tank of said chemical solution.

8. The method for recycling waste shingles as described in claim 7 wherein said screened tubular rotating equipment comprises a screened tubular rotating sieve trommel.

9. The method for recycling waste shingles as described in claim 7 wherein said screened tubular rotating equipment comprises an angled screened tubular rotating equipment.

10. The method for recycling waste shingles as described in claim 9 wherein said angled screened tubular rotating equipment is at a lower elevation for a shingle input and at a higher elevation for a fiberglass output.

11. The method for recycling waste shingles as described in claim 7 wherein said step of inputting said asphalt shingle into said screened tubular rotating equipment comprises the step of inputting said asphalt shingle through a conveyor belt and hopper into said screened tubular rotating equipment.

12. The method for recycling waste shingles as described in claim 7 and further comprising the step of moving said reacted asphalt shingle through said screened tubular rotating equipment to a separated fiberglass output.

13. The method for recycling waste shingles as described in claim 12 wherein said separated fiberglass exits said fiberglass output and wherein said separated fiberglass comprises no sand.

14. The method for recycling waste shingles as described in claim 12 wherein said step of moving said reacted asphalt shingle through said screened tubular rotating equipment to a fiberglass output comprises the step of upwardly moving said reacted asphalt shingle through said screened tubular rotating equipment to a fiberglass output.

15. The method for recycling waste shingles as described in claim 14 wherein said step of upwardly moving said reacted asphalt shingle through said screened tubular rotating equipment to said fiberglass output is assisted by a plurality of rings in said screened tubular rotating equipment.

16. The method for recycling waste shingles as described in claim 12 and further comprising providing a spray system for said separated fiberglass exiting said fiberglass output of said screened tubular rotating equipment.

17. The method for recycling waste shingles as described in claim 16 and further comprising the step of washing separated shingle oil from said fiberglass with said spray system.

18. The method for recycling waste shingles as described in claim 16 and further comprising providing a conveyor belt to transport said separated fiberglass from said fiberglass output to said spray system.

19. The method for recycling waste shingles as described in claim 7 and further comprising the step of providing rotating mechanical agitation to said reacted asphalt shingle.

20. The method for recycling waste shingles as described in claim 7 and further comprising mixing said asphalt shingle with said chemical solution in said tank.

21. The method for recycling waste shingles as described in claim 12 and further comprising allowing said separated asphalt shingle granules to fall to a bottom of said tank through said screened tubular rotating equipment.

22. The method for recycling waste shingles as described in claim 21 and further comprising the step of removing said separated asphalt shingle granules from said tank.

23. The method for recycling waste shingles as described in claim 22 wherein said step of removing said separated asphalt shingle granules from said tank comprises the step of removing said separated asphalt shingle granules from said tank with a grain auger.

24. The method for recycling waste shingles as described in claim 22 and further comprising the step of washing said separated asphalt shingle granules to remove said separated asphalt shingle oil from said separated asphalt shingle granules to provide said oil free recyclable sand.

25. The method for recycling waste shingles as described in claim 24 and further comprising the steps of:
collecting water and said separated asphalt shingle oil from said washing step;
separating said separated asphalt shingle oil from said water; and
recycling said separated asphalt shingle oil.

26. The method for recycling waste shingles as described in claim 24 wherein said step of washing said separated asphalt shingle granules to remove oil from said separated asphalt shingle granules comprises the step of washing said separated asphalt shingle granules to remove oil from said separated asphalt shingle granules in a trommel.

27. The method for recycling waste shingles as described in claim 22 and further comprising the step of extracting staples from said separated asphalt shingle granules with a magnet.

28. The method for recycling waste shingles as described in claim 7 wherein said step of reacting said asphalt shingle in said chemical solution comprising the step of liquifying said reacted asphalt shingle in said screened tubular rotating equipment so that said separated asphalt shingle oil is collected in said tank.

29. The method for recycling waste shingles as described in claim 1 wherein said recyclable oil comprises crude oil.

30. The method for recycling waste shingles as described in claim 1 wherein said chemical solution comprise at least one petroleum chemical.

31. The method for recycling waste shingles as described in claim 1 wherein said chemical solution comprise alicyclic solvents and aliphatic solvents.

\* \* \* \* \*